UNITED STATES PATENT OFFICE.

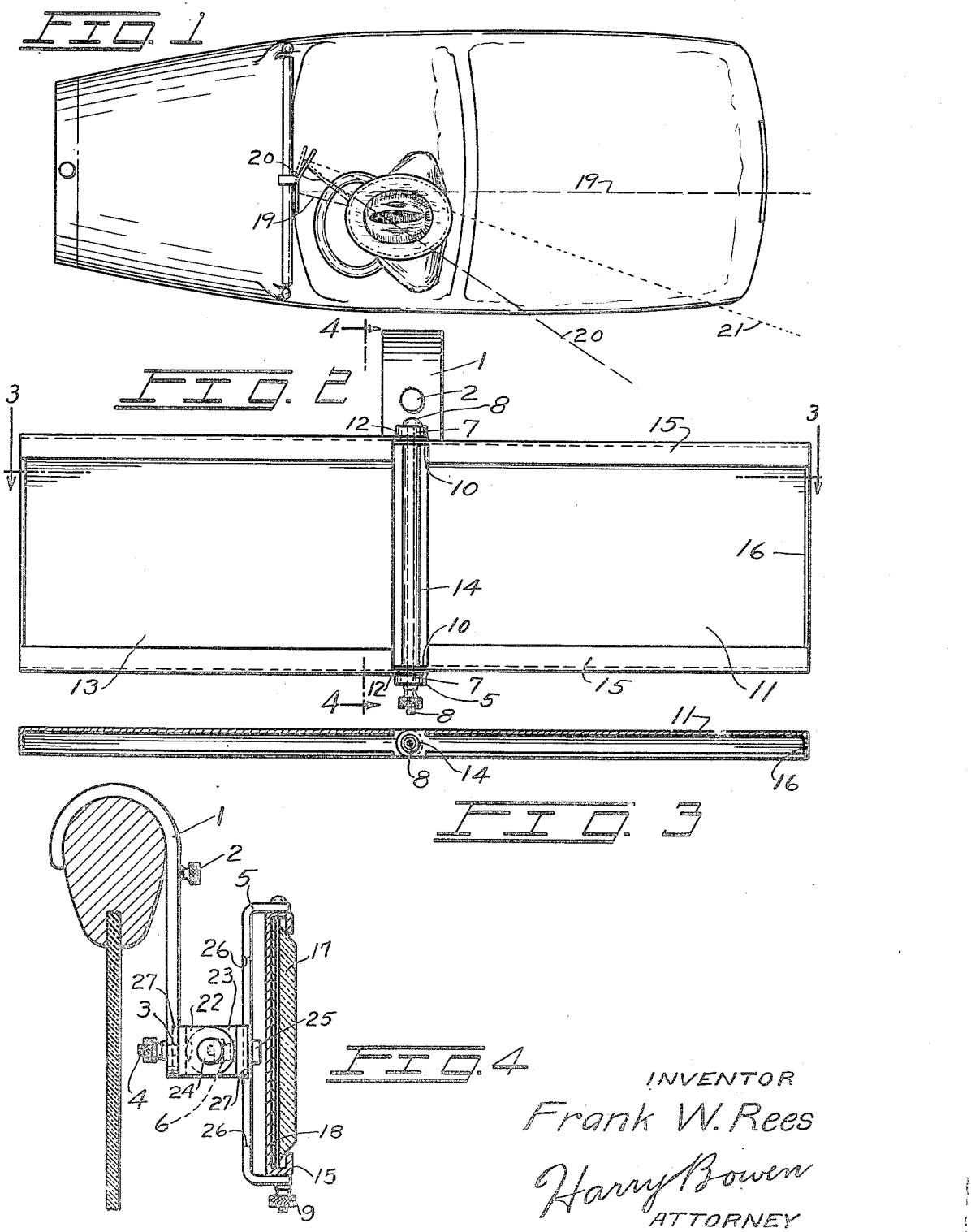

FRANK W. REES, OF SEATTLE, WASHINGTON, ASSIGNOR TO HUGH H. WELBON, OF SEATTLE, WASHINGTON.

ADJUSTABLE AUTO MIRROR.

1,420,145.  Specification of Letters Patent.  Patented June 20, 1922.

Application filed October 4, 1921. Serial No. 505,222.

*To all whom it may concern:*

Be it known that I, Frank W. Rees, a citizen of the United States, residing at Seattle, county of King, and State of Washington, have invented a new and useful Adjustable Auto Mirror; and I do hereby declare that the following is a full, clear, and exact specification, such as will enable others skilled in the art to which it appertains to make and use the same.

The invention is a device for enabling the driver of an automobile to observe another automobile approaching from the rear or from either side.

The object of the invention is to provide an auto mirror which may be hung on the windshield and which may be constructed of two halves hinged together so that they may be set at any desired angle in order to cause a line of sight to go through the rear window or windows or through openings in the curtains on the sides.

A further object is to provide an auto mirror constructed of two halves hinged together and hung in a bracket with a slotted hole so that the mirror may be raised and lowered, twisted to any desired angle in order to cause the line of sight to go through the rear window or windows or through the sides.

With these ends in view the invention embodies two metal frames, the edges of each being crimped over to hold a mirror and each having projections from one end with holes in them so that as a bolt is placed through them they form a hinge; a U shaped bracket for supporting these frames at the hinge and clips for holding the bracket to the top of the windshield.

Other features and advantages of the invention will appear from the following description taken in connection with the drawings, wherein:—

Figure 1 is a part plan view of an automobile.

Figure 2 is a front elevation of the device with the glass removed.

Figure 3 is a cross section on line 3—3 of Figure 2.

Figure 4 is a cross section on line 4—4 of Figure 2.

In the drawings I have shown my mirror as it would be installed on an automobile in Figure 1 with the clip 1 over the upper bar of the windshield and held to it by the thumbscrew 2 as shown in Figure 4. In the lower end of the clip 1 is a hole 3 in which is a bolt 4 which holds the clip 22. To the clip 22 is attached another clip 23 by a bolt with a thumb nut 24. In the other leg of the clip 23 is a hole in which is a bolt 25 with a thumb nut 6 on it, and this bolt 25 is held in a slot 26 in a U shaped bracket 5. By loosening the thumb nuts 6 or 24, the bracket 5 may be moved or twisted upward or downward. On the edges of the clips 22 and 23 are the lips 27 and 28 which fit around the sides of the clip and bar to hold them upright. In the extended ends of the bracket 5 are holes 7 through which the bolt 8 with a thumb nut 9 on its lower end is placed.

Between the extended ends of the bracket 5 are the flanges 10 from the frame 11 and the flanges 12 from the frame 13 which are also pivotally mounted upon the bolt 8. Between these flanges is a tube 14 which is around the bolt 8 and acts as a separator. The frames 11 and 13 are constructed of flat pieces of plate with the sides 15 bent around as shown in Figure 4 and one end 16 bent up as shown in Figure 3. It will be seen that part of the sides are extended to form the flanges 10 and 12 at the opposite ends of the frames from the ends 16.

The mirror 17 may be slipped into the frames before the ends 16 are bent up and then the end 16 bent to hold the mirror in place. A fibre backing 18 may be placed in the frames back of the mirror to prevent its getting the direct shock from the glass against metal.

It will be understood that changes may be made in the construction without departing from the spirit of the invention. One of which changes may be in the use of frames with rounded corners instead of square corners as I have shown, or in the use of a different shaped clip for supporting the mirror as the screw 2 may be screwed directly into the frame which would not make it necessary for the upper end to go over the top of the frame.

The operation will be readily understood from the foregoing description. To use the device it is placed upon the top of the windshield as shown in Figure 1 and one side of the mirror adjusted so that the line of sight will go from the driver to the mirror and then directly through the rear window along the line 19. It will be easy to adjust the mirror so that the line of sight will go through the rear window whether there be one or two windows as it may be slid along the windshield and the angle adjusted to suit the driver. The other glass may be set outward as shown so that the line of sight will travel along the dash line 20. It will be seen that if this is set in the right position the line of sight may be made to go through any window in a closed car or through the openings in the curtains of an open car. Or if desired this glass may be set to cause the line of vision to pass out of the opposite side of the car. The dotted line 21 indicates where the line of sight would be if the right hand side of the mirror were set in the position shown in the dotted lines instead of the full line position.

Having thus fully described the invention, what I claim as new and desire to secure by Letters Patent is:—

1. An auto mirror of the class described comprising two metal frames with their edges crimped to hold mirrors, flanges extending from the ends of the frames, holes in the flanges, a bolt through the flanges forming a hinge, a pipe separator around the bolt between the flanges, a U shaped bracket, holes in the end of the bracket for supporting the bolt in the hinge of the frames, a thumbnut on the end of the bolt, a clip for supporting the bracket, a slotted hole in the bracket, a bolt projecting from the center of the clip through the slotted hole, a thumbnut on the end of the bolt for holding the bracket, another clip pivotally mounted on the former clip for holding the mirrors at any desired angle and a screw for holding this clip to a bar with a clip having a set screw in it at its upper end for holding it to the windshield.

2. A device of the type described embodying two rectangular shaped glass mirrors; metal frames with their edges crimped around the mirrors to hold them; projections on the inner ends of the two frames having holes in them; a bolt passing through the holes in the projections having a separator on it between the projections and a thumb nut on it for holding the mirrors at any desired angle to each other; a U shaped bracket with a slot in its body and holes in its projected ends through which the above mentioned bolt also passes; two angular shaped clips pivotally connected together mounted on a screw with a thumb nut in the slot in the U shaped bracket at one end and attached by another screw with a thumb nut on it to the lower end of a hanger at the other; and a clip on the upper end of the hanger with a set screw in it for holding the device to the upper side of the windshield.

FRANK W. REES.